US006623227B2

United States Patent
Scott et al.

(10) Patent No.: US 6,623,227 B2
(45) Date of Patent: Sep. 23, 2003

(54) DRILL SCREW FOR ADJUSTING MOLDING RELATIVE TO AN UNDERLYING WALL

(75) Inventors: Martin Scott, Ridgefield, CT (US); William C. Shaw, Ridgefield, CT (US)

(73) Assignee: Copemaster, LLC, Ridgefield, CT (US)

( * ) Notice: Subject to any disclaimer, the term of this patent is extended or adjusted under 35 U.S.C. 154(b) by 0 days.

(21) Appl. No.: 09/916,387

(22) Filed: Jul. 27, 2001

(65) Prior Publication Data

US 2003/0021654 A1 Jan. 30, 2003

(51) Int. Cl.[7] .............................................. F16B 25/10
(52) U.S. Cl. .................... 411/387.6; 411/386; 411/399; 52/481.1
(58) Field of Search ............................. 411/386–387.8, 411/29, 30; 408/224, 225; 52/481.1

(56) References Cited

U.S. PATENT DOCUMENTS

| 3,827,331 | A | * | 8/1974 | Muenchinger | ............ | 411/387.4 |
| 4,064,784 | A |   | 12/1977 | Adler | | |
| 5,295,774 | A | * | 3/1994 | Roberts | .................... | 411/387.2 |
| 5,499,896 | A | * | 3/1996 | Cafarelli | .................. | 411/387.2 |
| 5,520,491 | A |   | 5/1996 | Miyagawa | | |
| 5,743,690 | A | * | 4/1998 | Royle | ......................... | 411/178 |
| 5,759,003 | A | * | 6/1998 | Greenway et al. | .......... | 411/421 |
| 6,042,314 | A |   | 3/2000 | Guelck | | |
| 6,142,719 | A |   | 11/2000 | Daubinger | | |

FOREIGN PATENT DOCUMENTS

GB    1068245    5/1967

* cited by examiner

Primary Examiner—Fleming Saether
Assistant Examiner—Jori R. Schiffman
(74) Attorney, Agent, or Firm—Gordon & Jacobson, P.C.

(57) ABSTRACT

A drill screw includes a boring end having cutting edges adapted to cut when rotated in a counterclockwise direction, and a portion having threads adapted to enter a piece of molding when rotated in a clockwise direction. The drill screw is driven into a piece of molding in the counterclockwise direction to bore a hole therethrough and cause the threads to meet the face of the molding. The drill screw is then rotated in the clockwise direction to cause the threads to tap into the molding, bore through the wall behind the molding, and contact a jackpost behind the wall. Rotation of the drill screw thereafter causes the molding to ride outward from the wall and over the drill screw such that the molding contacts an adjoining piece of molding at an inside corner and thereby substantially eliminating any gap therebetween.

10 Claims, 4 Drawing Sheets

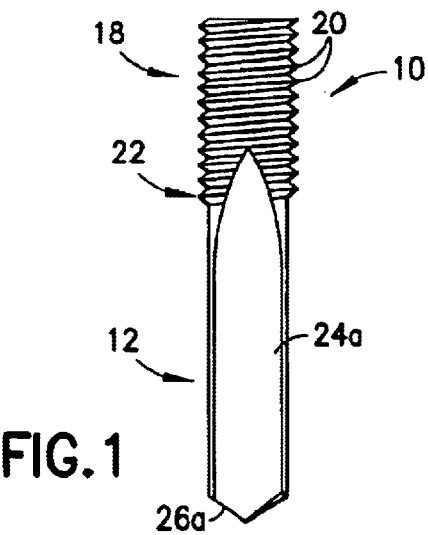
FIG.1
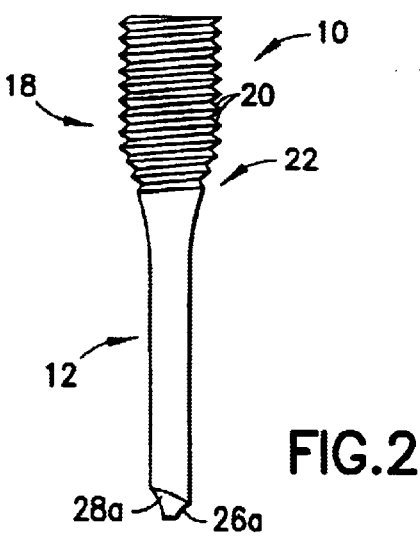
FIG.2
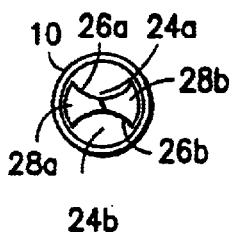
FIG.4
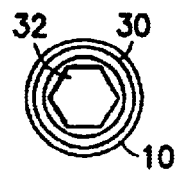
FIG.3
FIG.6
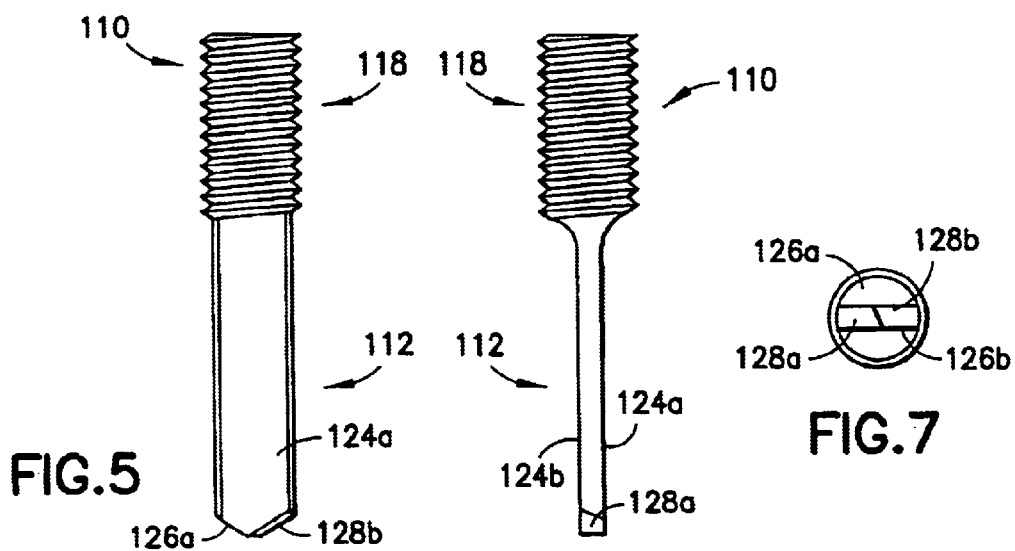
FIG.5
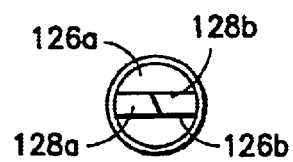
FIG.7

DRILL SCREW FOR ADJUSTING MOLDING RELATIVE TO AN UNDERLYING WALL

BACKGROUND OF THE INVENTION

1. Field of the Invention

This invention relates broadly to threaded screw-like articles. More particularly, this invention relates to a threaded device having a drilling tip.

2. State of the Art

Molding is often nailed to the walls of a room to provide an attractive border to the room. Molding along the wall adjacent the floor is called baseboard molding. Molding along a central portion of the wall is called chair rail molding, often used to prevent the back of a chair from scraping and scarring the wall. The molding provided around a ceiling is referred to as crown molding and is often applied between the wall and ceiling at an angle such that the profile, or contoured pattern, of the face side of the molding is directed into the room. Coping is the process whereby the end of one piece of molding is shaped to seat flushly against the face of another piece. This ensures that the two pieces of molding have an attractive appearance when joined at an inside corner. Yet, the walls at an inside corner are not always true. Moreover, referring to FIG. 8, the drywall 210, 212 to which molding 214, 216 is attached includes a taper 218 along its edges intended to be filled by tape and joint compound, collectively 220. However, the tape and joint compound is often not applied at a lower taper 222 of the drywall 210, 212. Therefore, when the bottom 224 of baseboard molding 214 is nailed to the bottom plate 226 (the horizontal wooden stud which runs along the floor) or the lower portion of a vertical stud 228, the bottom 224 of the molding 214 gets "pulled in" at the location of the lower taper 222 of the drywall. As a result, a square cut end 232, or a skillfully coped end, of piece of molding 216 may not fit flushly against the "pulled in" adjoining molding piece 214, resulting in a non-flush fit and gap 236 at the bottom of the inside corner. As molding is decorative, a finished appearance is very important to the building owner, as well as to the skilled and proud craftsman.

Once a problem fit at an inside corner is recognized, it is common to try to resolve the problem and provide a flush fit by the use of one or more shims behind a first piece of molding which faces a coped edge of a second piece of molding to make a flush corner fit. However, the process of shimming requires loosening the attachment of the first piece of molding from the drywall, selection of an appropriate shim, insertion of the shim behind the molding, holding the coped end of the second piece of molding against the first piece, and a reevaluation of the fit. If the fit is not corrected, another shim is selected and inserted and again the fit is reevaluated. The process is repeated until a suitable fit is obtained, and then the first piece of molding is re-nailed to the wall, with shim in place, and the second piece is nailed to the adjoining wall with its coped end flush against the first piece. Another method for correction is to scribe the coped end of the molding for a proper fit against the "pulled in" molding, re-cut the coped molding along the scribe, and then re-cope the end of a piece of molding so that it fits flushly against the "pulled in" molding. Both methods are extremely labor intensive.

SUMMARY OF THE INVENTION

It is therefore an object of the invention to provide a device which, at an inside corner, moves a first piece of molding flushly against an edge of a second piece of molding.

It is another object of the invention to provide a device which permits adjustable movement of the first piece of molding relative to the second piece of molding.

It is a further object of the invention to provide a device which can be used without loosening the first piece of molding from the wall.

It is an additional object of the invention to provide a device which is capable of creating a tight fit between first and second pieces of molding over a great range of gap sizes therebetween.

In accord with these objects, which will be discussed in detail below, a drill screw is provided having a drill portion provided with cutting edges adapted to bore into wood when rotated in a first rotational direction (e.g., counterclockwise), a driver end opposite the drill portion, and a threaded portion between the drill portion and the driver end. The threaded portion is provided with threads adapted to tap into wood when rotated in a second rotational direction opposite the first rotational direction (e.g., clockwise). The driver end has a diameter no greater the diameter of the threads (i.e., there is no head on the drill screw) to permit the driver end to be located below the surface of a piece of molding. As such, for stable rotation for insertion of the drill screw, the driver end is preferably provided with a hex opening adapted to receive an interference head of a driver, e.g., a hex bit, coupled to a preferably powered drill/driver.

In context, a first piece of molding is coupled to drywall (or another wall type) which overlies a wooden stud structure (e.g., 2×4 stud framing over a bottom plate). A coped second piece of molding is then coupled to an adjacent wall, with the coped end of the second piece of molding meeting the face of the first piece of molding at an inside corner defined by the walls. If the bottom face of the first piece of molding does not form a flush interface with the coped end, it is necessary to move the bottom end of the first piece toward the second piece at the corner to provide a clean look.

The drill screw of the invention is then driven in the first rotational direction to bore a hole at least through the bottom of the first piece of molding. The drill screw is then driven in the second rotational direction causing the threads to engage and tap into the molding. When the drill screw sufficiently enters the molding a distance such that the end of the drill portion contacts the bottom plate (or stud), it is noted that the drill screw rubs, but does not bore into (or further into) the bottom plate (or stud) in the clockwise direction. As the drill screw does not move into the bottom plate or stud, the molding around the drill screw is forced away from the drywall and toward the coped end of the adjoining molding, thereby closing the gap between the two pieces of molding and providing a clean molding interface at the corner. It is noted that because the first piece of molding is also secured to the bottom plate or stud structure with nails, the molding must be forced over the head of the nails. This is possible, as the force of the drill screw overpowers the grip of the nails. Moreover, the top of the molding does not pull away from the wall at other locations to create a different unsightly gap. Once the gap is closed, the driver is removed from the driver end of the drill screw. The bore between the driver end of the drill screw and the surface of the first piece of molding is then filled with a wood fill or covered by a shoe molding for finishing.

In view of the foregoing, it will be appreciated that the drill screw of the invention permits both pieces of molding at a corner to be attached to the wall and then, if necessary, adjusted without removal of either piece of molding. The adjustment is relatively quick, requiring only a single drill screw of the invention and a driver for the tool.

Additional objects and advantages of the invention will become apparent to those skilled in the art upon reference to the detailed description taken in conjunction with the provided figures.

BRIEF DESCRIPTION OF THE DRAWINGS

FIG. 1 is a side elevation view of a drill screw according to a first embodiment of the invention;

FIG. 2 is a side elevation view of the drill screw of FIG. 1 taken 90° relative to the view of FIG. 1;

FIG. 3 is an end view of the driver portion of the drill screw of FIG. 1;

FIG. 4 is an end view of the drill portion of the drill screw of FIG. 1;

FIG. 5 is a side elevation view of a drill screw according to a second embodiment of the invention;

FIG. 6 is a side elevation view of the drill screw of FIG. 5 taken 90° relative to the view of FIG. 5;

FIG. 7 is an end view of the driver end of the drill screw of FIG. 5;

DETAILED DESCRIPTION OF THE PREFERRED EMBODIMENTS

Figure 8:
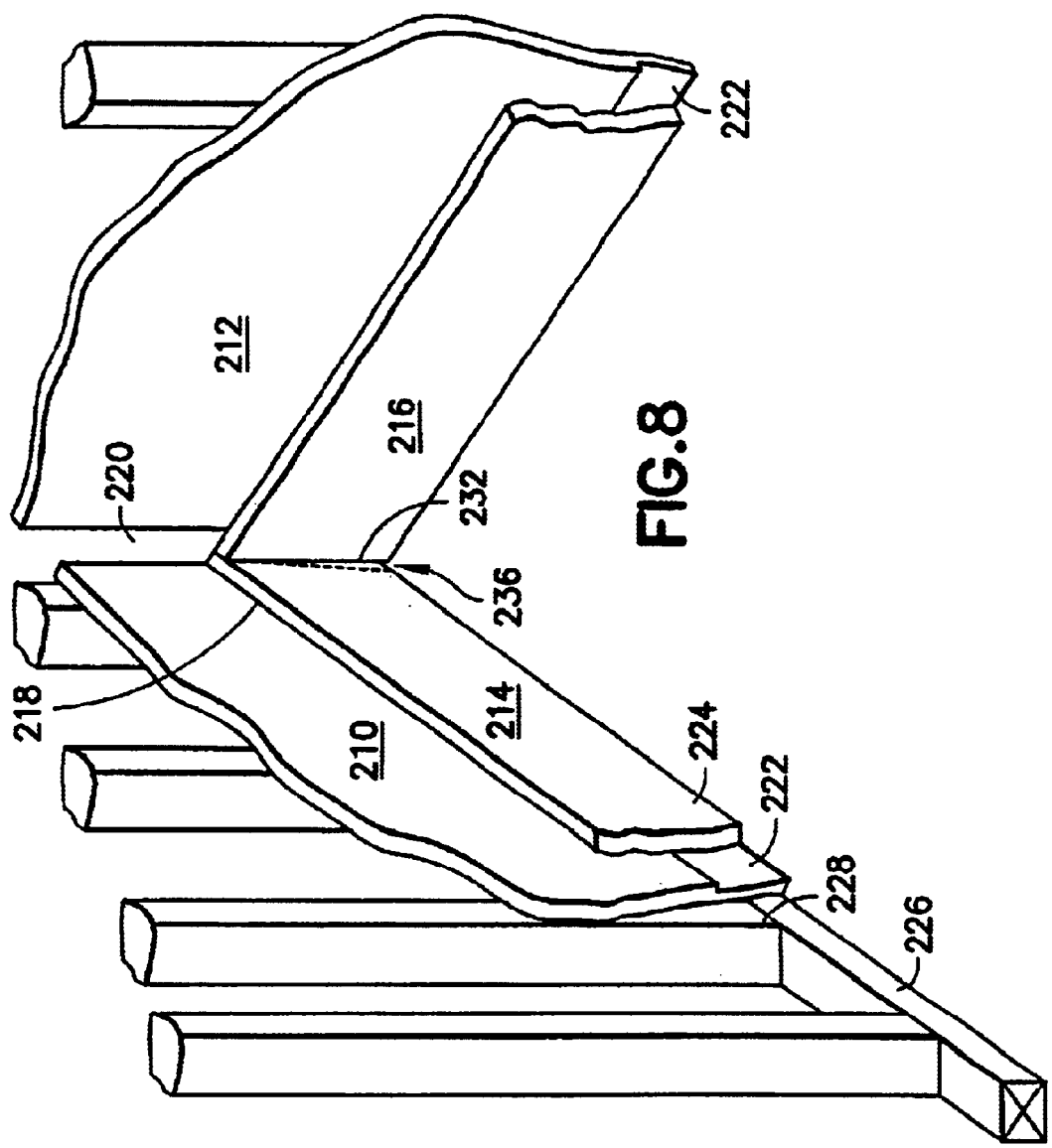
FIG. 8 illustrates the attachment of first and second pieces of molding at an inside corner and a gap formed therebetween.

Turning now to FIGS. 1 through 4, a first embodiment of a drill screw 10 according to the invention includes a drill portion 12 adapted to bore into wood when rotated counterclockwise (i.e., in a first rotational direction), and a threaded portion 18 provided with threads 20 adapted to tap into (threadably engage) wood when rotated clockwise (i.e., in a second rotational direction opposite the first rotational direction), and a transitional portion 22 therebetween. The drill portion 12 preferably has a smaller diameter relative to the threaded portion 18. The drill screw is preferably made from steel or another material from which a wood drill bit or wood screw is made from.

More particularly, in the first embodiment, the drill portion 12 includes two concave flutes 24a, 24b each having a cutting edge 26a, 26b. A relief cut surface (or bevel) 28a, 28b is provided behind each cutting edge. This arrangement permits the cutting edge to enter fresh wood when rotated in the counterclockwise direction, but substantially prevents cutting when rotated in the clockwise direction. Rather, the drill portion rubs against, but does not cut, wood in the clockwise direction. When wood is cut, the flutes 24a, 24b operate to remove cut material from the bored hole.

The threaded portion 18 has a driver end 30 for coupling with a tool adapted to rotate the drill screw 10. The driver end 30 has a diameter no greater than the diameter of the threads 20; i.e., there is no head on the drill screw. As such, for stable rotation for insertion of the drill screw into molding, a wall, and the underlying wooden structure, the driver end is preferably provided with an opening 32 adapted to receive an interference head of a driver, e.g., a hex opening adapted to receive a hex bit coupled to a preferably powered drill/driver. In a preferred embodiment, the threaded portion 18 includes twenty threads per inch.

Exemplar dimensions for the drill screw 10 include: a total length of approximately 1.25 inches, a thread portion length of approximately 0.5 inch, a thread portion diameter of approximately 0.25 inch, a drill portion length of approximately 0.65 inch, a drill portion diameter of approximately 0.18 inch, and a transitional portion length of approximately 0.15 inch. These dimensions will provide a drill screw suitable for use in molding 0.75 inch and thinner. Of course, the drill screw may be provided in other sizes in order that it be adapted for use in thicker molding, or as preferred.

Turning now to FIGS. 5 through 7, according to a second embodiment of the invention (with like parts having reference numerals incremented by 100), the drill screw 110 similarly includes a drill portion 112 and a threaded portion 118. According to the second embodiment, the drill portion 112 generally includes two substantially planar sides 124a, 124b, each terminating in a cutting edge 126a, 126b. Similar to the first embodiment, each cutting edge 126a, 126b is provided with an adjoining bevel 128a, 128b which permits the cutting edge to enter fresh wood when rotated in the counterclockwise direction, but substantially prevents cutting when rotated in the clockwise direction.

The first and second embodiments illustrate that various drill portion designs can be used. It is noted that any drill portion which bores in a first rotational direction, but not in an opposite second rotational direction, can be used.

Figure 9:
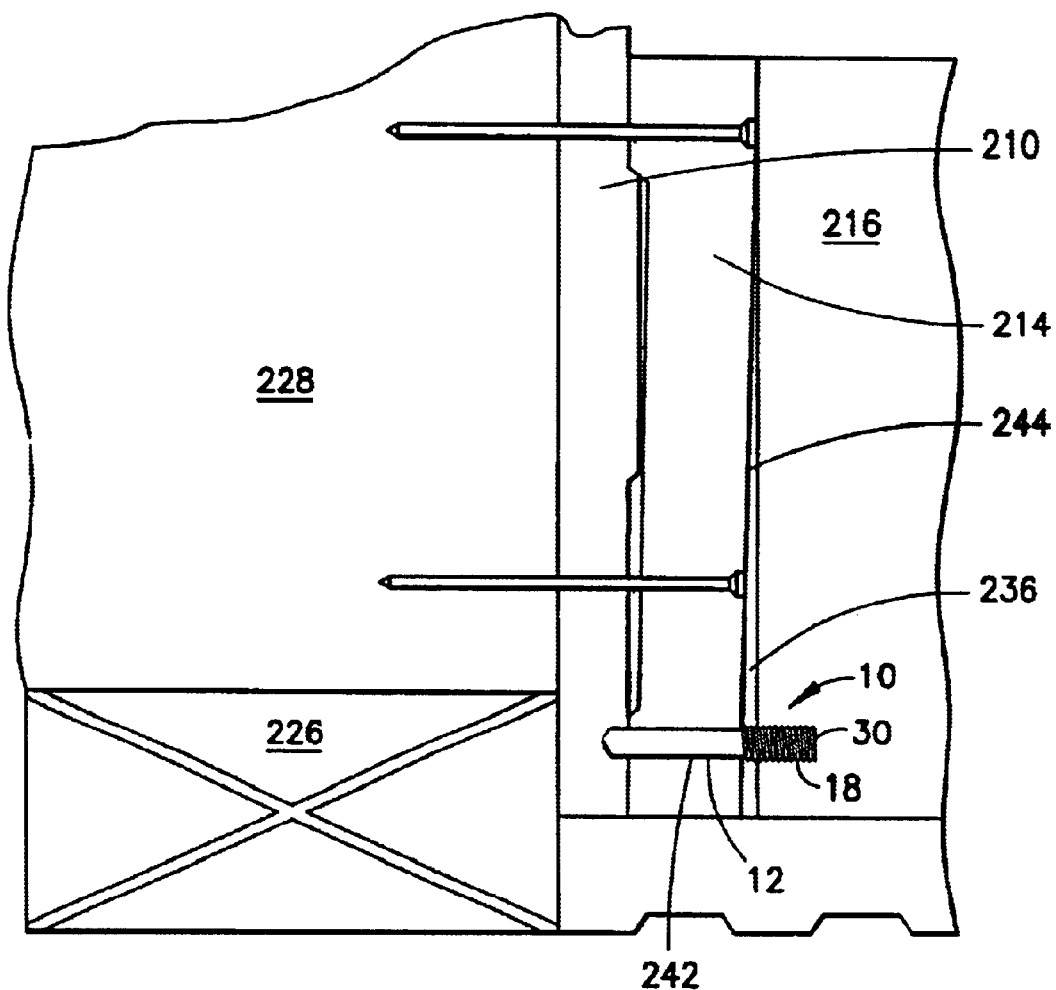
FIGS. 9 through 11 illustrate the use of the drill screw of the invention to adjust a first piece of molding relative to the second piece of molding to eliminate the gap.
Figure 10:
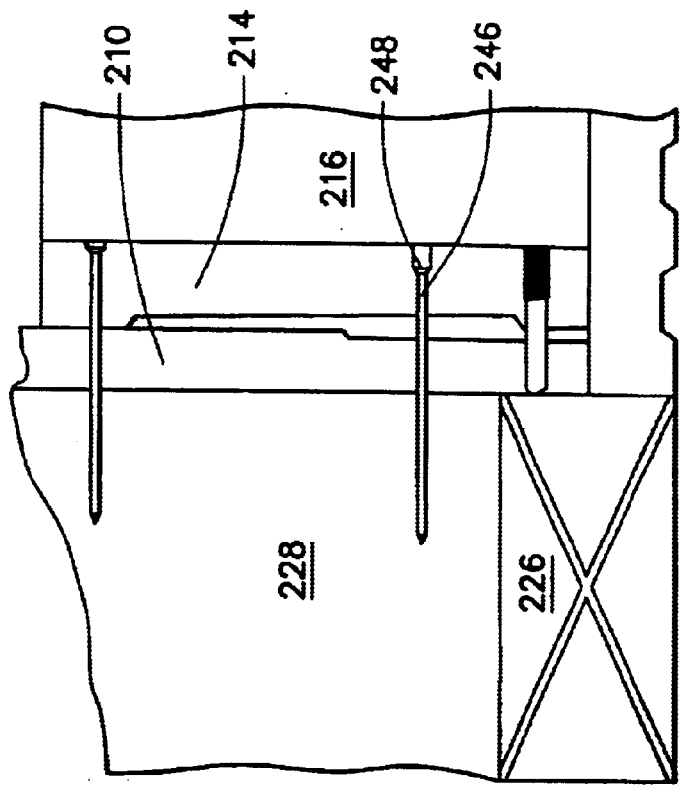
Figure 11:
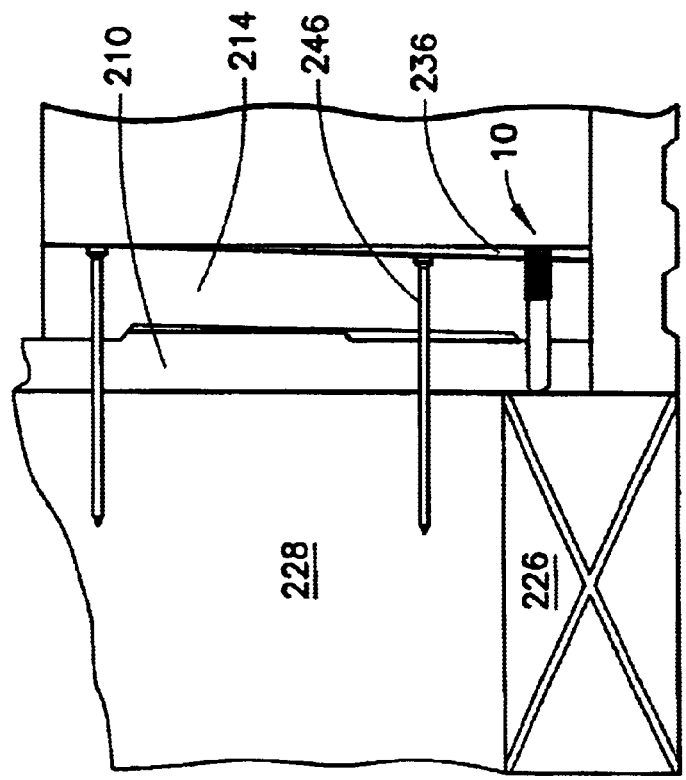

Referring now to FIGS. 8 through 11, when a gap 236 is present between two pieces of molding 214, 216 at an inside corner (FIG. 8), the drill screw 10 of the invention is used to close the gap. The driver end 30 of the drill screw 10 of the invention receives a hex tool (not shown) (e.g., a hex bit coupled to a power drill capable of driving rotation in two directions) and is driven in a counterclockwise direction to cause the drill portion 12 to bore a hole 242 through the first piece of molding 214 until the threaded portion 18 of the drill screw 10 abuts the surface 244 of the molding (FIG. 9). The drill screw 10 is then driven in the clockwise direction, preferably without necessitating decoupling the tool from the driver end of the drill screw. When driven in the clockwise direction, the threaded portion 18 engages and taps into the molding 214 while the drill portion crumbles the drywall 210 (if present at the location of the drill screw) as a result of pressure applied (FIG. 10). When the drill screw 10 sufficiently enters the molding a distance such that the end of the drill portion 12 contacts the bottom plate 226 (or stud 228), it is noted that the drill screw rubs, but does not bore into the bottom plate (or stud) in the clockwise direction. As the drill screw 10 does not move into the bottom plate 226 (or stud 228), further rotation of the drill screw causes the molding 214 around the drill screw to be forced away from the drywall 210 and toward the end 232 of the adjoining molding 216, thereby closing the gap 236 (FIG. 10) between the two pieces of molding 214, 216 and providing a clean molding interface at the inside corner (FIG. 11). It is noted that because the first piece of molding is also secured to the bottom plate 226 (or stud structure 228) with nails 246, the molding 214 may be forced over the head 248 of the nails. This is possible, as the force of the drill screw 10 overpowers the grip of the nails 246. Typically, this results in the nail 246 staying in place in the stud, but assuming a countersunk position in the molding 214 as shown in FIG. 11. Moreover, the top of the molding does not pull away from the wall at other locations to create a different unsightly gap. Once the gap 236 is closed, the driver is removed from the driver end of the drill screw. The bore between the driver end of the drill screw and the hole 242 in the surface 244 of the first piece of molding is then filled with a wood fill or covered by a shoe molding for finishing.

In view of the foregoing, it will be appreciated that the drill screw of the invention permits both pieces of molding at a corner to be attached to the wall and then, if necessary, adjusted without removal of either piece of molding. The adjustment is relatively quick, requiring the insertion of a single drill screw according to the invention.

Moreover, it will be appreciated that the drill screw has use beyond the fitting of molding, and may be used whenever a board needs to moved out from a surface and an object behind the surface is solid enough to resist the push of the screw. An additional exemplar use is to adjust the framing of a door jamb relative to the header and jackposts.

There have been described and illustrated herein several embodiments of a drill screw and a method of using the drill screw. While particular embodiments of the invention have been described, it is not intended that the invention be limited thereto, as it is intended that the invention be as broad in scope as the art will allow and that the specification be read likewise. Thus, while it is preferred that the cutting edges be adapted to cut in the counterclockwise direction and the threads be adapted to thread in the clockwise direction, it will be appreciated that the reverse may be provided; i.e., cutting on clockwise rotation, and threading in on counterclockwise rotation. In addition, while two cutting edges are preferred, it will be appreciated that the drilling portion may be configured with three or more cutting edges. Moreover, as discussed above, other cutting or boring means may be utilized. For example, a drilling portions provided with a spade portion, an auger portion, a bullet or pilot point, or a split point can also be used. That is, any cutting or boring means which creates a hole in a material when rotated in one rotational direction, but not the opposite rotational direction, and which is not substantially resisted from removal from the material; i.e., it is not adapted to become secured in the material, as a threaded screw would become secured. Further, while a hex opening is preferred for driving the drill screw, it will be appreciated that other headless driving systems, such as a square drive, could alternatively be used. In addition, while it is preferred that a powered driver be used to insert the drill screw, it will be appreciated that the drill screw may also be inserted manually using a tool, e.g., a hex wrench, which can provide bidirectional rotational force to the drill screw. It will therefore be appreciated by those skilled in the art that yet other modifications could be made to the provided invention without deviating from its spirit and scope as claimed.

What is claimed is:

1. A drill screw for positioning a molding material relative to a wall, comprising:
   a) a first portion having a boring end with at least one cutting edge adapted to cut a hole through the molding material when said drill screw is rotated in a first rotational direction; and
   b) a second portion having second rotational directional threads which are adapted to enter the molding material when rotated in said second rotational direction opposite said first rotational direction and a driving end provided with a means for receiving a driving tool, said driving end being headless for being received in the molding material
   said at least one cutting edge is substantially unable to cut when said drill screw is rotated in said second rotational direction, whereby the molding material is positioned relative to the wall when the drill screw is rotated in the second direction.

2. A drill screw according to claim 1, wherein:
said threaded portion has a diameter which is larger than a diameter of said boring end.

3. A drill screw according to claim 1, wherein:
said first rotational direction is counterclockwise and said second rotational direction is clockwise.

4. A drill screw according to claim 1, wherein:
said at least one cutting edge comprises first and second cutting edges.

5. A drill screw according to claim 1, wherein:
each of said at least one cutting edge is adjacent a bevel surface, and when said drill screw is rotated in said second rotational direction said bevel surface rubs against the molding material.

6. A drill screw according to claim 1, wherein:
each of said at least one cutting edge is associated with a flute.

7. A method of moving a board outward from a surface, the board having a face, and the surface having a substantially solid object therebehind, said method comprising:
   a) obtaining a drill screw having a first portion and a second portion, said first portion provided with a boring end having at least one cutting edge adapted to cut a hole in the board when said drill screw is rotated in a first rotational direction, and said second portion having second rotational directional threads which are adapted to enter the board when rotated in said second rotational direction opposite said first rotational direction, said second portion further including a driving end provided with a means for receiving a driving tool, said driving end being headless, wherein said drill screw is configured such that said at least one cutting edge is substantially unable to cut the substantially solid object when said drill screw is rotated in said second rotational direction;
   b) driving said drill screw in said first rotational direction into the board until said boring end bores a hole through the board and said threads meet the face of the board; and
   c) rotating said drill screw in said second rotational direction to cause said threads to tap into the board until the boring end contacts the substantially solid object behind the surface,
   the boring end forming a hole in the surface by at least one of said driving and said rotating prior to contacting the substantially solid object, and
   wherein rotating said drill screw after the boring end contacts the substantially solid object causes the board to ride outward from the surface over the drill screw so as to position the board relative to the surface.

8. A method according to claim 7, wherein:
said driving and said rotating are performed with a drill.

9. A method according to claim 8, wherein:
the drill is provided with a bit which removably couples to said drill screw, said bit remaining coupled to said drill screw during both of said driving and said rotating.

10. A method according to claim 7, wherein:
said first rotational direction is counterclockwise and said second rotational direction is clockwise.

* * * * *